Patented Feb. 14, 1939

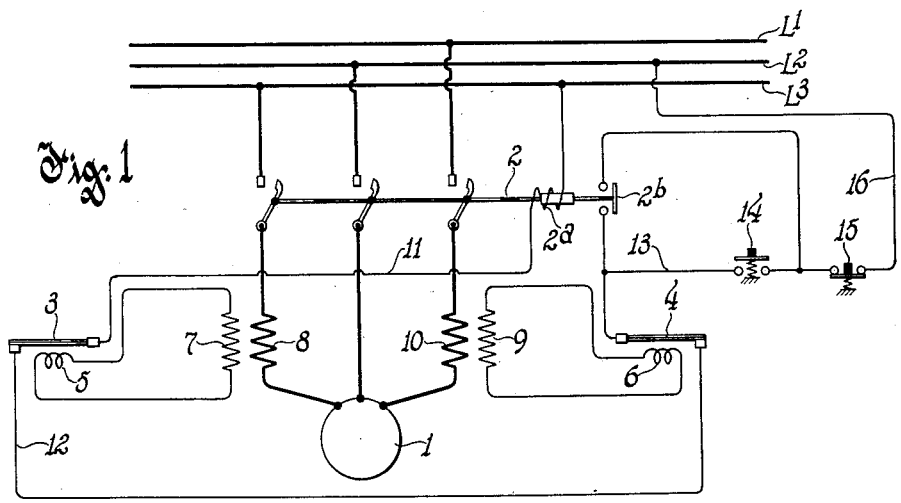
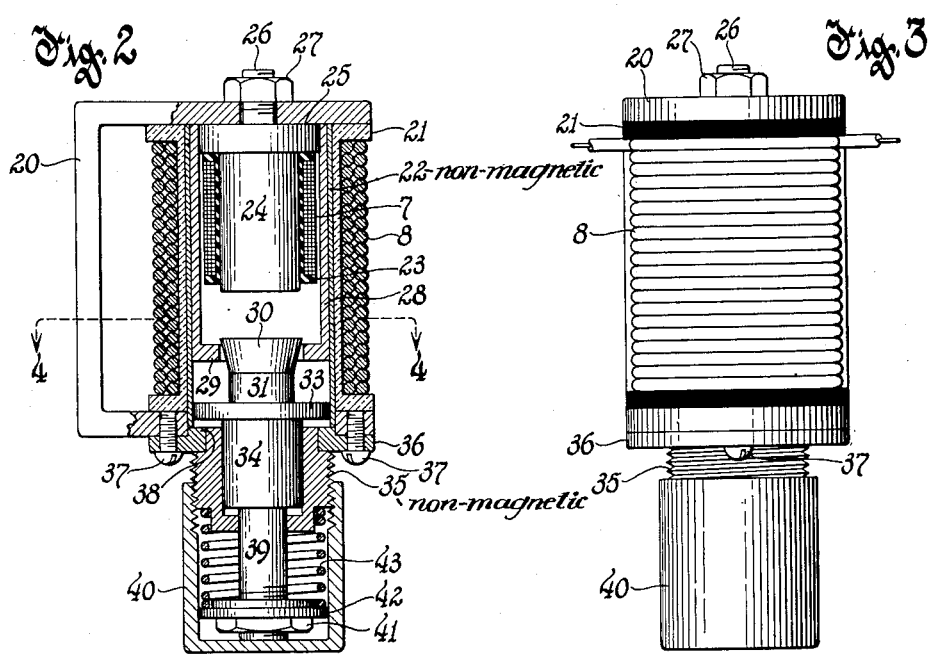
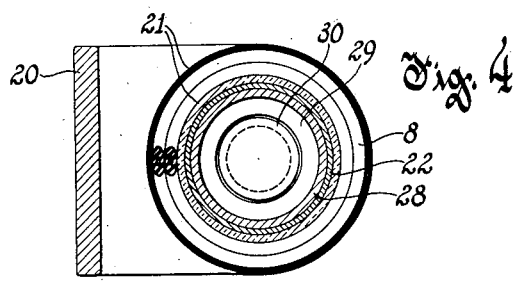

2,147,012

UNITED STATES PATENT OFFICE

2,147,012

AUTOMATIC PROTECTIVE CONTROLLER FOR ELECTRIC CIRCUITS

Robert W. Cousins, Gary, Ind.; Ida Evans Cousins administratrix of said Robert W. Cousins, deceased Application June 8, 1935, Serial No. 25,625

8 Claims. (Cl. 175—294)

This invention relates to automatic controllers for electric circuits, controllers embodying the invention being especially advantageous for overload protection of alternating current circuits.

The invention has among its objects to provide an improved controller suitable for a motor circuit and especially advantageous for an alternating squirrel cage motor connected to full line voltage for starting which will disconnect the controlled motor from its supply if the motor after starting is subjected to a relatively small overload for a given time, but which will permit supply of a considerably higher overload current to the motor for starting and accelerating it.

Another object is to provide improved overload protective means for motors, which means is responsive within a period varying inversely with the motor current.

Another object is to provide overload protective means of the character set forth in which thermal means are employed and in which the current supplied to the thermal means is limited to a maximum such as to prevent overheating of the thermal means as the result of excessive starting or short circuit currents.

Other objects and advantages of the invention will hereinafter appear.

The accompanying drawing illustrates an embodiment of the invention which will now be described, it being understood that the embodiment illustrated is susceptible of various modifications without departing from the scope of the appended claims.

In the drawing,

Figure 1 illustrates diagrammatically an alternating current circuit equipped with overload protective means including thermal relays.

Fig. 2 is a side elevational view largely in section, of a current transforming device constituting one form which the transformers diagrammatically illustrated in Fig. 1 may assume in practice.

Fig. 3 is a side elevational view of the aforementioned device viewed from the right of Fig. 2, and Fig. 4 is a sectional view taken on line 4—4 of Fig. 2.

Referring to Fig. 1, there is illustrated diagrammatically a squirrel cage motor I to be supplied from alternating current supply lines L¹, L² and L³ through a three pole electromagnetic main switch 2 which is subject to control by the overload protective means illustrated. Such overload protective means comprises like thermal switches or relays 3 and 4 each comprising a bimetallic strip normally engaging a stationary contact. The relays 3 and 4 are respectively provided with heater coils 5 and 6, either of which when supplied with a given current for a given time causes its respective bimetallic strip to disengage its contact. The coil 5 of relay 3 is supplied with current from the secondary winding 7 of a transformer having its primary winding 8 connected between line L³ and the left hand pole of the motor, while the coil 6 is supplied with current by the secondary winding 9 of a transformer having its primary winding 10 connected between line L¹ and the right hand pole of the motor.

The energizing circuit of the winding 2ª of main switch 2 extends from line L³, to and through said winding 2ª, by conductor 11, to and through the bimetallic strip of relay 3, by conductor 12, to and through the bimetallic strip of relay 4, by conductor 13 to a normally open push button switch 14 and upon closure of said switch to and through a normally closed push button switch 15 by conductor 16 to line L². The main switch 2 has an auxiliary contact 2ᵇ which upon closure of switch 2 completes a short-circuit for push button switch 14. Thus it will be observed that with the thermal switches or relays in circuit closing position the main switch may be energized by closing push button switch 14 and that upon response of the main switch the latter through its auxiliary contact 2ᵇ will short-circuit push button switch 14 to maintain said main switch energized upon release of switch 14 but subject to deenergization at will by opening of push button switch 15.

Referring to Figs. 2 to 4, the transformer shown therein comprises a U-shaped magnet frame 20 carrying primary and secondary windings which will be given the reference characters used for the transformer supplying current to the heater coil of relay 3, the primary winding accordingly being designated 8 and the primary winding 7. The primary winding is wound on a spool 21 of insulating material which spool is supported between the parallel legs of the magnet frame and which is held in place in the magnet frame by means of a non-magnetic sleeve 22 which is passed through an opening in the lower leg of the frame and through the spool 21 to abut the upper leg, being retained in place as hereinafter set forth. The secondary winding is wound on insulating spool 23 carried by a magnetic core 24 having an enlarged head 25 carrying a threaded stud 26 by which it is attached to the upper leg of the magnet frame, the stud passing through the frame and having a retaining nut 27.

Surrounding the secondary winding 7 is a steel cylinder 28 having its upper end snugly fitting the head 25 of the core 24 for support by the latter. The cylinder extends downwardly to a point intermediate the end of the core 24 and the lower leg of the magnet frame and said cylinder has at its lower end an inwardly extending annular wall 29, the central opening of this wall being about the diameter of the core and being concentric therewith. This opening in the cylinder 24 receives the head 30 of a plunger 31 of magnetic material, said head being of inverted frusto-conical shape and said plunger comprising several portions differing in diameter, the portion thereof adjoining the head being of considerably less diameter than the opening in cylinder 28. The plunger has within the magnet frame a flanged portion 33 closely fitting but slidable within the non-magnetic sleeve 22.

Projecting through and beyond the lower leg of the magnet frame the plunger 31 has a portion 34 closely fitting but slidable within a non-magnetic cup-like element 35 which at its upper end fits into a supporting plate 36 of magnetic material, said plate being secured by screws 37 to the underside of the magnet frame and being provided with an upstanding annular shoulder 38 supporting the non-magnetic sleeve 22. Also the plunger 31 has a portion 39 of less diameter than the portion 34 which projects through the bottom of the cup-like element 35 into another non-magnetic cup-like element 40 which at its upper end surrounds the element 35 and has a threaded connection therewith. This last mentioned portion of the plunger has its lower end threaded to carry an adjusting nut 41 upon which bears a shouldered washer 42 carrying a helical spring 43 which has its upper end surrounding the inner cup-like element 35 and bearing against an annular shoulder provided on said element.

The purpose of this construction of the current transforming device as stated very briefly is to provide for varying automatically according to the value of current supplied to the primary winding the coefficient of mutual inductance whereby when such current is below a given value the coefficient of mutual inductance will have a substantially constant low value and whereby the coefficient of mutual inductance will be higher when said current exceeds a given value. More specifically the device is so designed that when the primary current is below a given value the plunger is down, with the result that the ratio of mutual inductance is relatively low, whereas when the primary current exceeds a certain value the plunger is attracted, with the result of affording a higher ratio of mutual inductance. Thus if the transformers of Fig. 1 be of the construction described it will be apparent that while the motor current is below a certain value the induced current supplied to the heater coils may be maintained at a relatively low value subject to a very abrupt rise when the motor current exceeds a value such that the plunger will be attracted. As will be understood, the thermal switches upon responding individually or together provide for deenergizing the main switch to disconnect the motor, whereas neither will respond until supplied with current of a given value for a given time and it is proposed to design the thermal switches to respond only on the aforementioned step up in ratio of mutual inductance and to adjust the transformer devices to effect such step up, but not until the motor current exceeds a safe value. Also it is proposed to adjust the transformer devices to step down the ratio of mutual inductance at a current value very slightly below the safe value.

As will be understood, movement of the plunger provides for variation of the reluctance of the magnetic circuit threading the secondary winding and thereby provides for the aforementioned variation in coefficient of mutual inductance as a function of variation of the motor current. Also it will be understood that the transformer devices may be designed for wide variation in the value of the induced current supplied to the heater coils and that by designing such devices for movement of their plungers only when the motor current attains a given overload value the supply of current to the heater coils may under all normal conditions be maintained substantially constant. Further it will be apparent that the devices may readily be designed for saturation of their magnetic circuits upon overload of the motor whereby above a certain current value the coefficient of mutual inductance decreases and whereby the maximum induced current may be limited under all conditions to a value which the thermal devices may safely receive.

The purpose of the magnetic sleeve and tapered head of the plunger is to render the plunger releasable at a value of the motor current only slightly below that at which the plunger is attracted from its normal position, such construction being representative of various well known expedients which might be employed for the purpose stated. With this construction part of the magnetic flux when the plunger is in attracted position passes through the magnetic sleeve and plunger in vertical and horizontal directions and the resultant magnetic pull exerts a downward pull on the plunger which is opposed to the pull of the main flux. This opposing pull, of course, renders the plunger more sensitive to a decreasing motor current, and in practice it has been found that a device constructed as disclosed may be caused to release its plunger at a current value only slightly below the pull in value.

It is, of course, possible to construct the magnet in other ways by which the difference between the current at which the plunger is attracted and the current at which it is released is a minimum.

To set the transformer device to operate at the desired current values, the differential between the pull in and releasing values being known, the outer cup-like member 40 is first removed and the plunger is pushed upwardly into engagement with the core member 24. Then while the device is supplied with current the nut 41 is so adjusted as to effect release and dropping of the plunger at a given current value according to the protection desired. The outer cup-like element is then replaced, lifting the plunger 31 by engagement with its lower end, the adjustment of the cup being continued until the plunger has been lifted against the action of spring 43 into a position such that when the current supplied to the primary winding attains a given overload value according to the protection desired the plunger will be attracted. Thus the device is readily adjustable to respond at a given value of the supplied current and to release at a given lower value of the supplied current, and as above set forth the differential may be made very small if desired.

While the protective means illustrated preferably includes one or more thermal responsive switches or relays it will, of course, be understood that other types of relays with or without a time function may be employed in lieu of such thermal responsive relays. Also it is, of course, to be understood that the form of current transforming device illustrated may be modified in various respects without departing from the scope of the appended claims.

Whereas the means shown for adjusting the current value at which the plunger is lifted changes at the same time the air gap, and hence changes the value of the coefficient of mutual inductance, it is obvious that the spring which controls the required pull on the plunger may be utilized to permit of independent adjustments of the two quantities referred to, for instance by exchange of springs of different characteristics in accordance with the results desired. As indicated the means shown enable variation of the air gap to adjust the value of the lower coefficient of mutual inductance and selection and use of a suitable spring enables the desired value to be obtained, at the same time obtaining the desired adjustments of the current values at which the plunger is operated.

What I claim as new and desire to secure by Letters Patent is:

1. The combination with a circuit to be protected against overload, of protective means for said circuit comprising thermal means having a stationary heater coil and further comprising mutually inductive means to supply induced current to said coil and constituting the sole source of supply of current for said coil, said mutually inductive means being responsive to changes in value of the current of said circuit and having a relatively low and substantially constant coefficient of mutual inductance below a given value of the current of said circuit and a relatively high coefficient of mutual inductance at and above said given current value.

2. The combination with a circuit to be protected against overload, of overload protective means comprising thermal means having a stationary heater coil external of said circuit to be protected and mutually inductive means to supply induced current to said coil, said mutually inductive means being supplied with alternating current derived from said circuit and being sensitive to variations in the value of the current of said circuit, the coefficient of mutual inductance of said mutually inductive means being relatively low and substantially constant below a given value of the current of said circuit and being relatively high at and above such given current value.

3. The combination with a circuit to be protected against overload, of overload protective means comprising thermal means having a heater coil external of said circuit to be protected and mutually inductive means to supply induced current to said coil and solely through variation of the value of such induced current to render said thermal means inactive or active, said mutually inductive means being supplied with alternating current derived from said circuit and being sensitive to variations in the value of the current of said circuit, the coefficient of mutual inductance of said mutually inductive means being relatively low and substantially constant below a given value of the current of said circuit and being relatively high at and above such given current value, and said mutually inductive means inherently limiting the induced current supplied thereby to a given maximum value regardless of value attained by the current of the circuit to be protected, such given maximum value of induced current being such as to protect said coil.

4. Mutually inductive means comprising primary and secondary windings, a magnet frame for said windings, a movable magnetic member, said frame and said member affording a magnetic circuit with an air gap variable by movement of said member, said member when the current supplied to the primary winding is below a given value assuming a position such that the coefficient of mutual inductance is relatively low, and said member when said current rises to such given value moving to afford a higher coefficient of mutual inductance, and means associated with said movable member to render it releasable at a current value only slightly below the current value at which said member moves to effect increase in the coefficient of mutual inductance.

5. Mutually inductive means comprising primary and secondary windings, a magnet frame for said windings, a movable magnetic member, said frame and said member affording a magnetic circuit with an air gap variable by movement of said member, said member when the current supplied to the primary winding is below a given value assuming a position such that the coefficient of mutual inductance is relatively low, and said member when said current rises to such given value moving to afford a higher coefficient of mutual inductance, and means associated with said movable member rendering the same releasable at a curernt value slightly below that at which it moves to increase the coefficient of mutual inductance and to afford adjustments in respect of both aforementioned current values.

6. Mutually inductive means to energize means to protect a circuit against overload, comprising primary and secondary windings, a magnet frame for said windings, a movable magnetic member forming part of a magnetic circuit for both of said windings, said magnetic circuit having an air gap variable by movement of said member, means normally urging said member in a direction to increase said air gap and a second magnetic circuit shunting said secondary winding and providing a magnetic pull on said member aiding said means.

7. Mutually inductive means to energize means to protect a circuit against overload, comprising primary and secondary windings, a magnet frame for said windings, a movable magnetic member forming part of a magnetic circuit for both of said windings, said magnetic circuit having an air gap therein variable by movement of said member, spring means urging said member, against the magnet pull across said gap, in a direction to increase said gap, and a second magnetic circuit for said primary winding including said magnetic member and shunting said secondary winding to provide a magnetic pull on said member aiding said spring means, whereby said member moves in a direction lessening said gap and affording a higher coefficient of mutual inductance between said windings at a current value only slightly higher than that at which it moves in the opposite direction.

8. Mutually inductive means to energize means to protect a circuit against overload, comprising a primary winding, a secondary winding therewithin and concentric therewith, a magnet frame for said windings, a movable magnetic member forming part of a magnetic circuit for both windings through said frame centrally of said secondary winding, such magnetic circuit having an air gap therein variable by movement of said member, spring means urging said member, against the magnetic pull across said air gap, in a direction to increase said gap and a sleeve of magnetic material between said windings and forming part of a second magnetic circuit also including said member and said frame, said second magnetic circuit shunting said secondary winding and providing a magnetic pull on said member aiding said spring means, whereby said member moves in a direction lessening said air gap and affording a higher coefficient of mutual inductance between said windings at a current value only slightly higher than that at which it moves in an opposite direction.

R. W. COUSINS.